March 3, 1936. B. J. CAMPBELL 2,032,867
DISTANCE FINDER
Filed Feb. 9, 1935     4 Sheets-Sheet 1
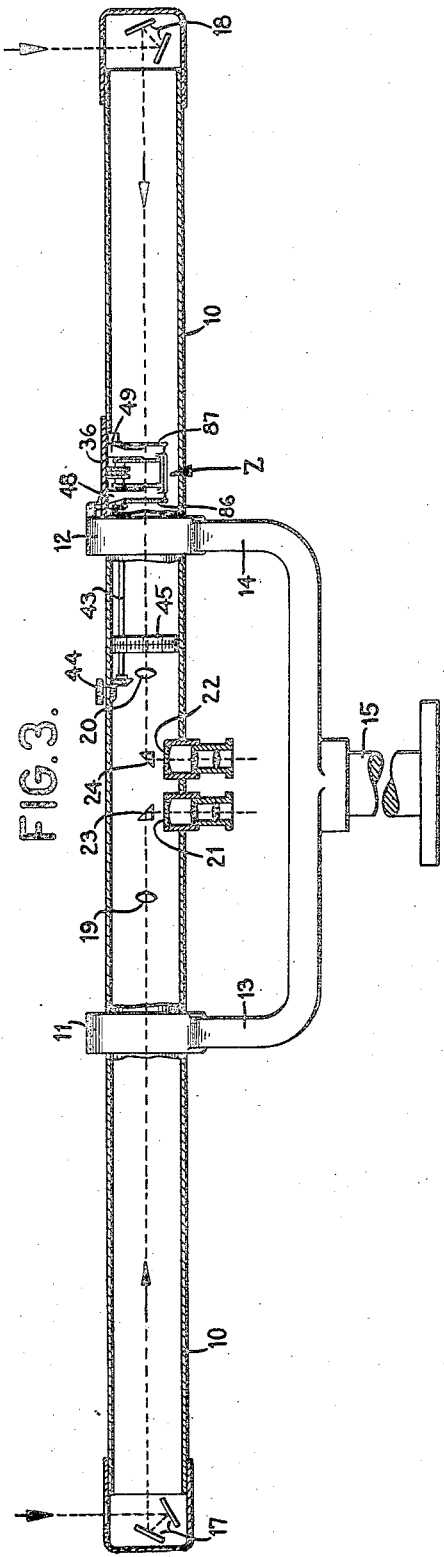
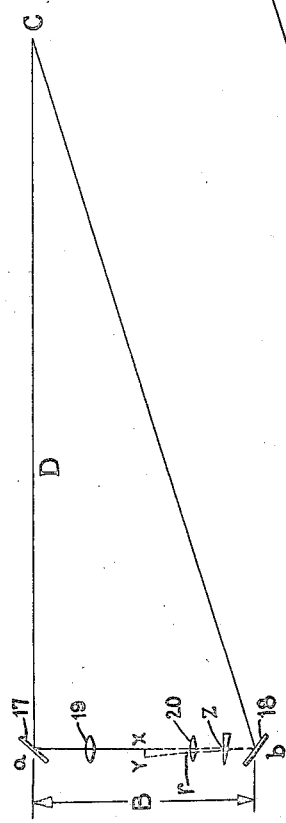
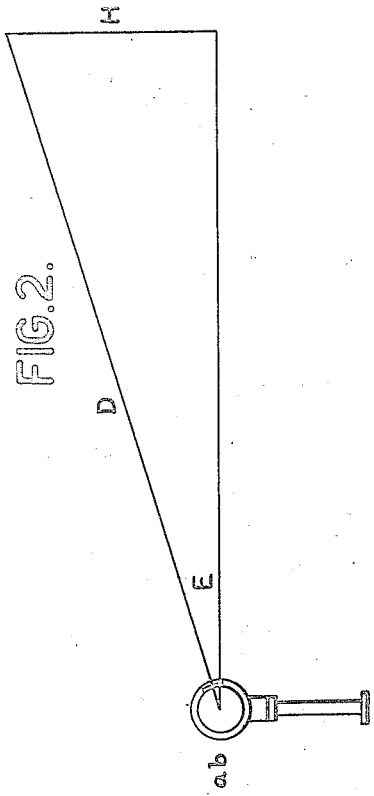
INVENTOR
BEN J. CAMPBELL
DECEASED
BY ALEXINA CAMPBELL
EXECUTRIX
Frederick Griswold Jr.
ATTORNEY March 3, 1936.    B. J. CAMPBELL    2,032,867
DISTANCE FINDER
Filed Feb. 9, 1935    4 Sheets-Sheet 2
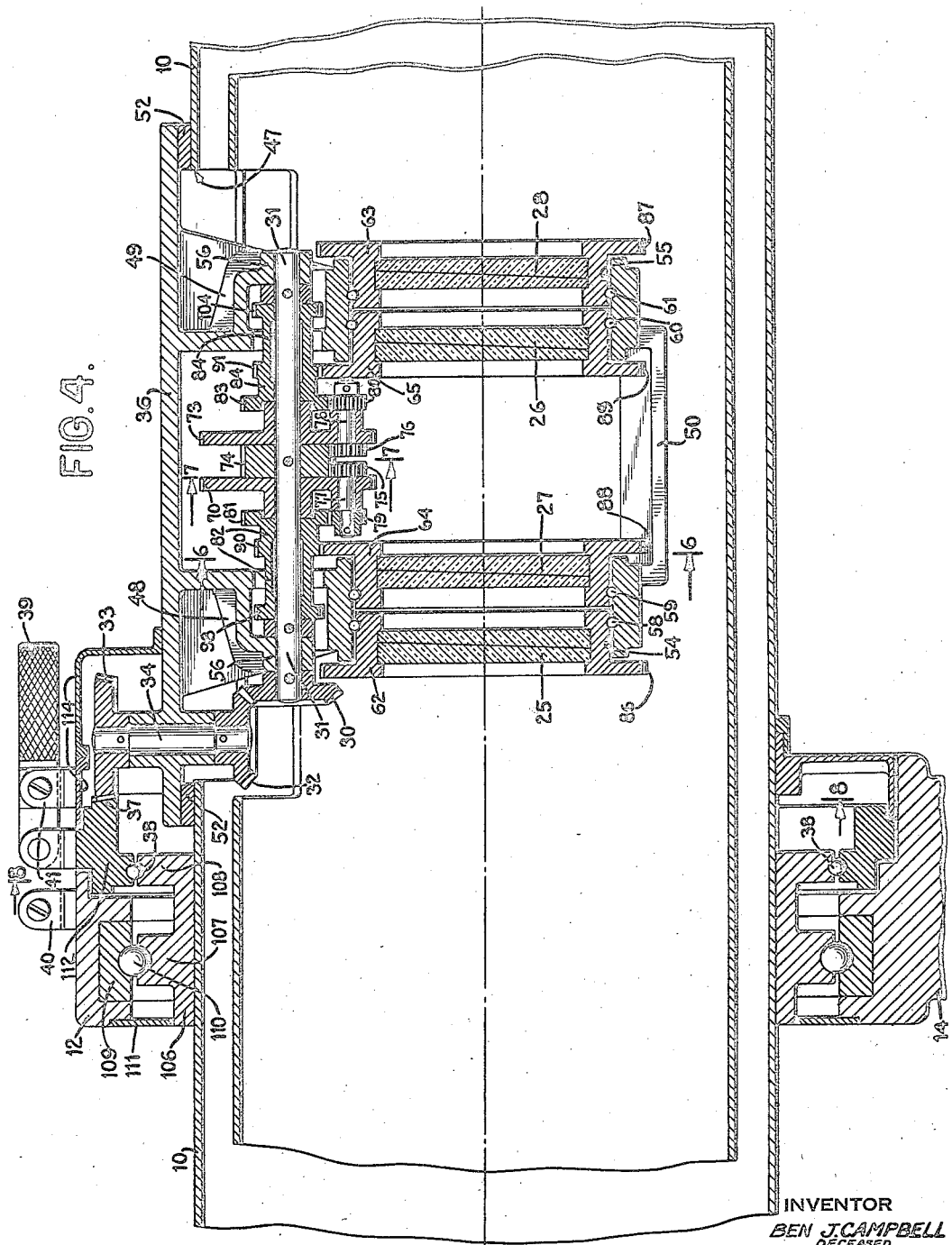
INVENTOR
BEN J. CAMPBELL
DECEASED
BY ALEXINA CAMPBELL
EXECUTRIX
ATTORNEY March 3, 1936.  B. J. CAMPBELL  2,032,867
DISTANCE FINDER
Filed Feb. 9, 1935  4 Sheets-Sheet 3
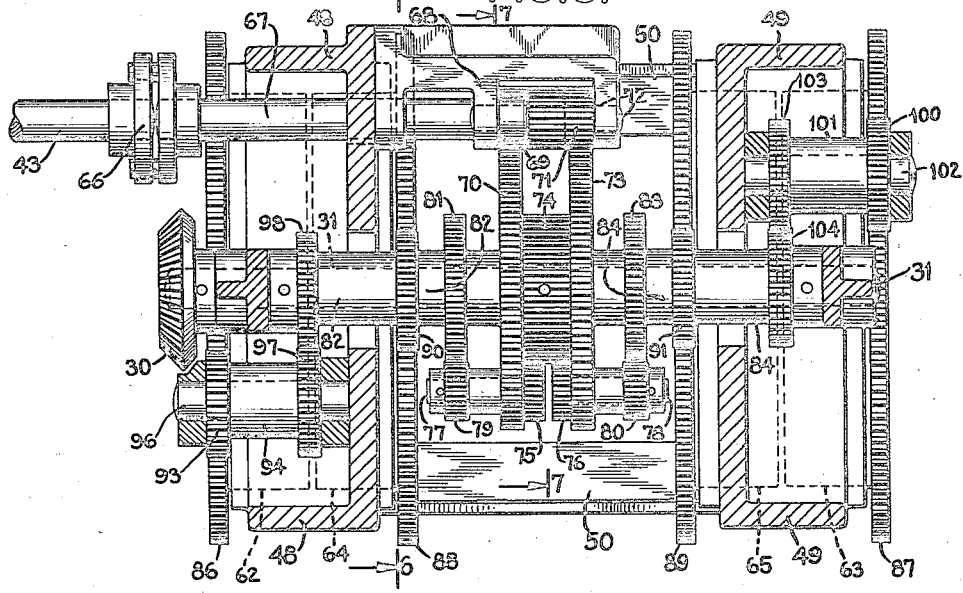
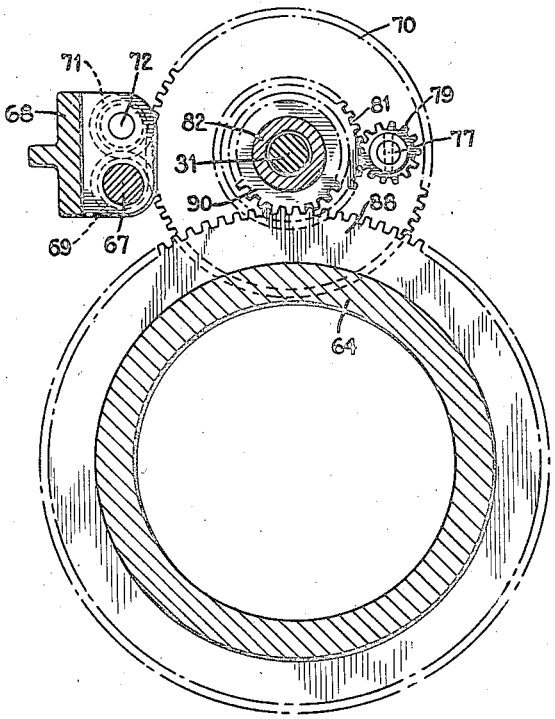
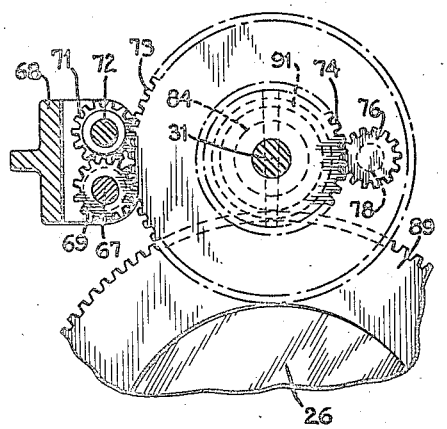
INVENTOR
BEN J. CAMPBELL
DECEASED
BY ALEXINA CAMPBELL
EXECUTRIX
ATTORNEY

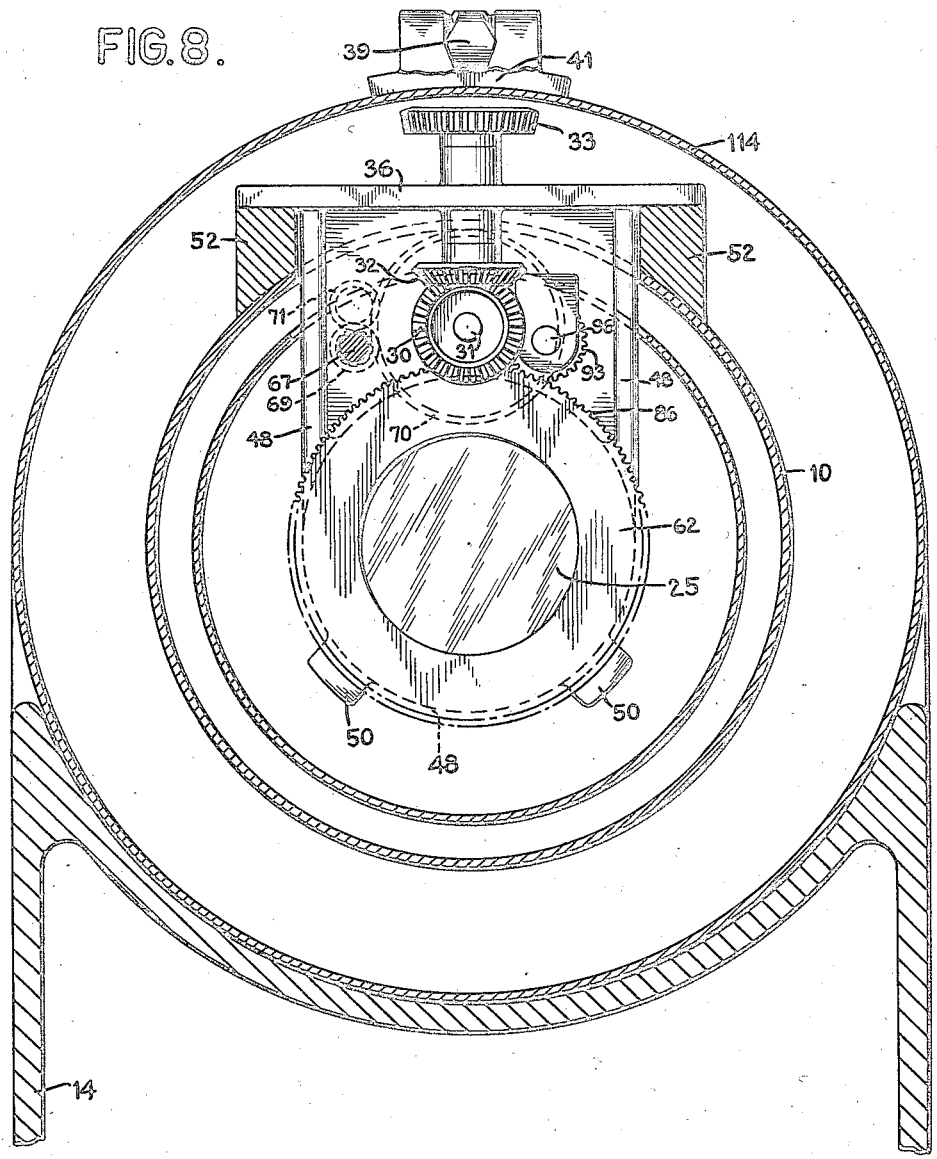

Patented Mar. 3, 1936

2,032,867

UNITED STATES PATENT OFFICE 2,032,867

DISTANCE FINDER

Ben J. Campbell, deceased, late of Hoboken, N. J., by Alexina Campbell, executrix, Hoboken, N. J., assignor to Keuffel & Esser Co., Hoboken, N. J., a corporation of New Jersey Application February 9, 1935, Serial No. 5,698

14 Claims. (Cl. 88—2.7)

This invention relates to instruments adapted to determine distances commonly referred to as telemeters, range finders, height finders or altimeters of the kind in which the height of an object (target), its slant range or the horizontal projection of its range is ascertained by reading an indication on a scale, for instance, on the instrument.

Instruments of the character described for measuring height, usually have optic systems providing a deflection of the light rays between the eye piece and the object glasses proportional to a function of the angle of sight of the plane containing the object and the axis of the instrument.

One object of the present invention is to provide instrumentalities for accurately restoring the parallax and accurately adjusting the optic systems with respect to one another in proportion to the angle of sight.

Another object of the invention is to incorporate the optic deflection systems and their means for relative adjustment in a unitary structure which, for convenience, is readily removable so that its accuracy may be tested, and for repair.

It is also an object of the invention to provide a removable structure with which the optic deflection systems are carried which permits the sealing of all joints.

The invention also seeks a device of the character described which is practical from the standpoint of ease and accuracy of manufacture, maintenance and use.

These and other objects of the invention and the means for their attainment will be more apparent from the following detailed description taken in connection with the accompanying drawings illustrating a preferred embodiment thereof, and in which:—

Figure 1 is a diagrammatic view illustrating the principle of operation of the invention;

Figure 2 is a diagrammatic view showing one use to which the invention may be put;

Figure 3 is a view showing the invention applied to a distance finder;

Figure 4 is a longitudinal sectional view, on an enlarged scale, showing the optic systems of the distance finder shown in Figure 3;

Figure 5 is a view showing the adjusting means for the optical ray deviating means looking from below;

Figure 6 is a fragmentary sectional view taken on the plane indicated by the line 6—6 of Figure 4 looking in the direction of the arrows;

Figure 7 is a fragmentary sectional view taken in the plane indicated by the line 7—7 of Figure 4, looking in the direction of the arrows; and Figure 3 is a transverse sectional view taken in the plane indicated by the line 8—8 of Figure 4 looking in the direction of the arrows.

Referring first briefly to Figure 3, instruments of this character often comprise a casing or tube 10, rotatably supported about a horizontal axis in bearings 11, 12 on the arms 13 and 14 which may be part of a stand 15. In the tube 10, at each end, are entrance reflectors 17 and 18, which deflect the rays received from a distant object along the horizontal axis to the objectives 19 and 20, which image the object at the focal planes 21 and 22 after reflection by prisms 23 and 24. On one side of the instrument, in parallel rays, between an objective 20 and its entrance prism 18, is placed a deflection prism system indicated generally at Z and composed of four prisms 25, 27, 26 and 28, Figure 4. These four prisms are contained in one assembly referred to herein as the compensator mechanism or height finding mechanism, which is operatively connected through bevel gear 30 on a shaft 31 of the system Z and bevel pinions 32 and 33 on a stub shaft 34 journalled in a closure base 36, the external bevel pinion 33 meshing with annular bevelled rack 37 encircling the casing 10 and rotatable thereabout, when desired, on ball bearings 38 but which may be secured by the latching lever 39 either by the stand fork 40 to the bearing 12 and stand 15 making the instrument a height finder, or to the tube 10 by casing fork 41 whereby the revolvable gear drive formed by the bevel pinions 32 and 33 are held stationary, making the instrument a range finder. Thus, when latched to the arm 14, a movement of the tube 10 about its horizontal axis will influence or actuate the height finding or compensator mechanism. A shaft 43 rotated from knob 44 by which is actuated the scale 45 for reading height is also connected with mechanism Z so that a turn of knob 44 will influence the range or height setting an amount which can be read off on scale 45.

Such an instrument is illustrated diagrammatically in Figure 1 wherein the light rays from a distant object C enter the left hand end of the instrument at the point $a$ and the right hand end at the point $b$. The distance between the points $a$ and $b$ is the base length B of the instrument and is fixed.

The point C may be considered as at a distance D (slant range) from the instrument. The point C will be imaged at $x$ through the left hand end of the instrument and at $y$ through the right hand end. A prism (or prism system) Z may be inserted in the path of the light ray $by$ to produce a deflection so that the parallax (the distance $xy$) may be made zero, i. e., the ray $Cby$ be made to deflect to $CbZx$. Now, the angle of deflection $yZx$ is equal to the angle $bCa$ and is proportional to $$\frac{B}{D},$$

as will be obvious. By varying the prism system a known measurable amount, the distance D will correspond to a definite deflection angle $yZx$ and can, therefore, be measured.

Let the prism system $z$ be replaced by a system of four prisms (25, 27, 26, and 28) each having an angle of deviation such that it produces a displacement at the focal plane equal to a distance $p$. Place the prisms so that 25 and 26 are base up and 27 and 28 are base down. Now let the prism 25 be rotated through an angle $r$ and prism 28 be rotated through an angle $-r$. The displacement $p'$ provided in the plane of triangulation, by prisms 25 and 28 will be $2p \sin r$. Then $p' = 2p \sin r$. The deflection provided by prisms system 26 and 27 will also be $2p \sin r$ so that the deflection of prisms 25 and 27 and 26 and 28 together will be $2p' = 4p \sin r$.

Now if the two wedges 25, 28 be bodily rotated as a unit through an angle E and the two wedges 26, 27 be rotated as a unit through the angle $-E$, then the displacement $p''$ in the focal plane for any definite angles $r$ and E equals $4p \sin r \sin E$; that is, $p'' = 4p \sin r \sin E$.

Since the total displacement in the plane of triangulation is proportional to $$\frac{B}{D},$$

then from similar triangles $$\frac{p''}{f} = \frac{B}{D}$$

where $f = xZ =$ the focus of objectives 19 and 20. Then $$\frac{p''}{f} = \frac{B}{D} = \frac{4p \sin r \sin E}{f}$$

$$\frac{B}{D \sin E} = \frac{4p \sin r}{f}$$

and since H is the height of the target C and in the triangle of Figure 2 is equal to $D \sin E$, then substituting this value in the foregoing equation:

$$\frac{B}{H} = \frac{4p \sin r}{f}$$

or $$H = \frac{Bf}{4p \sin r}$$

$Bf$ and $p$ are constant, so the height H depends only on the angle of rotation $(r)$ of the wedges (prisms) and thus the height may be read off on a scale 45 rotated in synchronism with the means turning the prism system.

In other similar instruments, the deflection prism or prisms have been placed between the objective and the eye piece in the converging or diverging rays. In this position, the amount of deflection at the focal plane varies with the distance of the individual wedges from the focal plane, i. e., the deflection is not strictly a function of the strength of the wedges and their relative rotation, but also depends on their distance from the focal plane. Thus a system of four wedges placed in the converging beam will not follow the simple equation $$H = \frac{Bf}{4p \sin r}.$$

However, when the deflection prisms are placed in the parallel rays between the objective and the entrance prisms, then the distance between prisms or their position along the optical axis does not affect the resultant deflection of the image at the focal plane.

In the illustrated embodiment, the deflecting prism system of this invention is disposed between one of the objectives and an entrance prism, in the parallel rays. It comprises two optic systems or compensators shown as wedges 25, 28 and 26, 27 rotatable about the axis of the instrument in equal and opposite directions. Each optic system or compensator comprises two elements or wedges (prisms) 25, 28 and 26, 27, respectively, each rotatable about the axis of the instrument in equal and opposite directions. As shown in Figures 4, 5, and 8, an opening 47 formed in the wall of the tube 10 receives a frame 36, 48, 49, 50, the base portion 36 thereof serving as a base or support for the structure as a whole upon which all the parts are assembled and by which it is removably secured to the wall of the tube. Suitable packing 52 seals the joint to prevent moisture and dust entering the tube.

The spaced plane frame portions 48, 49 are integral with the base 36 and are formed, respectively, with cylindrical openings 54, 55, in the axis of the tube for the passage of the light rays, the surfaces of which openings serve as bearings for rotatable parts of the height mechanism.

Integral with the parts 48, 49 outwardly of bearings 54, 55 are bracket members 56 in which the shaft 31 is conveniently journalled. The inner surfaces of the bearings 54 and 55 serve as raceways for ball bearings 58, 59, 60, 61 on which the wedge frames 62, 63, 64, and 65 turn about the axis of the tube 10.

For both range and height finding, motion is effected from the range knob 44 which turns the shaft 43 within the tube and which shaft is removably coupled, as at 66 (Figure 5) to a metering shaft 67 journalled in a bearing bracket 68 carried on frame member 48 and having an external planetary drive pin on 69 on its end within the frame.

In height finding, the instrument is elevated, that is, rotated about its axis to direct the entrance prisms to the elevated object. Fixed on the main shaft 31 outwardly of the bracket 48 is the bevel pinion 30 so that when the rack 37 is held stationary by engaging latching lever 39 with stand fork 40 and the tube 10 is turned therein by elevating the instrument, the shaft 31 is rotated. This shaft effects adjustment by imparting some of the necessary motions to the prisms, as will be made clear hereinafter.

Pinion 69 (Figures 5, 6, and 7) is meshed with planetary gear 70 journalled on shaft 31 and through idler 71 on stub shaft 72 also drives in the opposite direction a similar planetary gear 73 also freely rotatable on the shaft 31. Fixed on shaft 31 between the freely rotatable gears 70 and 73 is a sun gear 74 in mesh with pinions 75, 76 fixed respectively, on the proximate ends of stub shafts 77 and 78 journalled, respectively, in the gears 70 and 73 and forming in each case a revolving planetary pinion set. On the remote ends of the shafts 77 and 78 of these sets are fixed, respectively, pinions 79 and 80. Pinion 79 is in mesh with a left sleeve driving a gear 81 integral with a carrier driving sleeve 82 freely rotatable on shaft 31 on the remote side of gear 70 from gear 74, and pinion 80 is similarly in mesh with a sleeve driving gear 83 integral with a right carrier driving sleeve 84 freely rotatable on the shaft 31 on the remote side of planetary gear 73 from sun gear 74. The gear trains 70, 75 and 74, and 73, 76 and 74 may each be considered a planetary differential.

The annular prism carriers 62, 63, 64, 65 for the respective prism wedges 25, 28, 27, and 26 are each formed with an annular carrier gear 86, 87, 88, and 89 by which the respective carriers are rotated in the required directions. The gears 88 and 89 are directly driven from the differential gearing shown as the planetary gearing (Figure 4) in that gear 88 is in mesh with a carrier driving pinion 90 fixed on or integral with the sleeve 82 and gear 89 is in mesh with a carrier driving pinion 91 on sleeve 84. Gear 86 tends to rotate in a direction always opposite to the rotation of gear 88 since it is in mesh with a pinion 93 fixed on a sleeve 94 freely rotatable on a stub shaft 96 journalled in the frame 48, the sleeve 94 also carrying a pinion 97 in mesh with pinion 98 on sleeve 82 and forming a reversing carrier gear drive between sleeve 82 and carrier gear 86. Gear 87 is driven similarly to gear 86 in that it is in mesh with pinion 100 of sleeve 101 on the stub shaft 102 journalled in frame 49 on the opposite side of a vertical plane including the axis of shaft 31 from the stub shaft 96. Sleeve 101 also carries pinion 103 which is in mesh with the pinion 104 on sleeve 84.

To permit freedom of rotation of the tube 10 within the bearings 11 and 12, it is mounted in anti-friction bearings. Thus an inner annular bearing member 106 fixed on tube 10 is formed with ball races 107 and 108. The ball race 107 cooperates with the annular external bearing 12, or more specifically a ball race 109 therein, rotating in that ball race on the balls 110. This ball bearing is protected against the weather by an annular shield 111.

The annular bevelled rack 37 is similarly mounted on anti-friction bearings shown as the series of balls 38 between the ball race 112 formed on the bevelled rack 37 and the ball race 108. This side of the anti-friction bearings is protected against the weather by a shield or casing portion 114 conveniently carried with the base 36 of the height mechanism and on which the fork 41 is mounted.

The operation of the device will be apparent from the foregoing description. Suffice it to say that when the shaft 43 is stationary and the circular rack 37 is stationary with respect to the stand 15, rotation of the tube 10 about its axis in focusing the instrument on a distant object will cause a rotation of the shaft 31 to thereby rotate sun gear 74 which in turn revolves the two planetary pinion sets and thus rotates the pinions 76 and 75, the planetary gears 70, 73 being stationary or locked in position by the stationary shaft 43 and its external drive pinion 69. The carriers 62, 64 are thus rotated in equal and opposite directions (as are also the carriers 63, 65) in an amount proportional to the rotation of the tube about its axis.

Thus, the movements of the respective optic systems and their component elements in the manner described will permit a direct reading of the height (H) of an object C above the horizontal as explained at the beginning of this description. Moreover, if the latching lever 39 is disconnected from the stand fork 40 and the annular rack 37 and pinion 33 are locked together by engagement of latching lever 39 with the casing fork 41, the distance (D) to the object C may be read directly from the scale as will be understood.

It will thus be seen that, in an altimeter having two objectives, optical means, i. e., the wedges of the height mechanism, is interposed in the path of parallel rays to the one and adjacent objective, that is, between the objective and its corresponding end reflector, and means is provided to adjust the optical means to move the image produced by the adjacent objective relative to the stationary image produced by the remote objective. The path of relative movement of the image thus produced is a straight line, the image always remaining in the field of the eyepiece.

Moreover, an extremely simple actuating mechanism for the wedges of the height mechanism has been provided which is extremely accurate in its adjustment of the wedges. The function of shafts 31 and 43 may be reversed, i. e., shaft 31 may be actuated by the range knob 44 while shaft 43 may be operatively connected with the elevating mechanism to obtain the same results.

A unitary structure supporting and incorporating the optic systems is also provided which is readily removable and insertable for adjustment, testing and repair. The structure can be assembled with the utmost accuracy since the component parts and adjustment are based upon the alignment of two parallel shafts in bearings in the same frame supporting the wedges for rotation. When the height mechanism and its actuating means are in place the telemeter is completely sealed against the admission of dust and moisture.

Various modifications will occur to those skilled in the art in the disposition and configuration of the component elements as well as in the substitution of parts performing the same functions and no limitation is intended by the phraseology of the foregoing description or illustrations in the accompanying drawings.

What is claimed is:—

1. In a device of the class described, the combination of a stand provided with an external bearing and provided with a stand fork, a casing provided with a coacting internal bearing and with a casing fork, antifriction devices between the bearings, an annular rack encircling the inner bearing, antifriction devices between the rack and the inner bearing, a latching lever pivoted to the rack and adapted to engage selectively either fork thereby to lock the rack at will to either the casing or its stand, a main shaft, a revolvable gear drive between the rack and main shaft to drive or lock the main shaft, a pair of deflection prisms mounted for rotary movement and a planetary gear drive between the main shaft and the deflection prisms, said planetary gear drive including a sun gear on the main shaft and a planetary gear connected thereto, manually adjusted means engaging the planetary gear to rotate the planetary gear drive and thus the prisms when the sun gear is locked from rotation by the latching lever engaging the casing fork and whereby the rotation of the casing in the external support bearing by the engagement of the latching lever in the stand fork will cause the revolvable gear drive in its engagement with the rack to rotate the chain of parts including the main shaft, the sun gear, the planetary gear drive and the prisms.

2. In a device of the class described, the combination of two pairs of prism carriers mounted for rotary movement about a common axis and arranged in two pairs, and each provided with a carrier gear, a main shaft provided with a sun gear, a pair of sleeves one for each pair of carriers loose on the shaft and on opposite sides of the sun gear, each sleeve provided at its end adjacent the other with a sleeve driving gear, a pair of planetary gears, one between the sun gear and each sleeve, a pair of planetary pinion sets, one for each planetary gear and journalled therein, each set geared to the sun gear and to its associated sleeve driving gear, each sleeve being in mesh with the carrier gear of one of the carriers of its associated pair and a pair of reversing gear drives, one geared to each sleeve and geared with the other carrier of its associated pair, an idler gear means between the planetary gears for causing them to rotate in relatively reversed directions, whereby whenever either the sun gear or a planetary gear is rotated the prism carriers of each pair will rotate in relatively reversed directions and each carrier of one pair will rotate in the same direction as a carrier of the other pair.

3. In a device of the class described, the combination of two prism carriers mounted for rotary movement about a common axis and each provided with a carrier gear, mechanism engaging the carrier gears to rotate the carriers simultaneously in mutually reversed directions, said mechanism including a main shaft, a sun gear secured to the shaft, a planetary gear loose on the shaft, a carrier driving sleeve loose on the shaft and provided with three integral gears, a pinion shaft journalled in the planetary gear and having a pinion in mesh with the sun gear and another pinion in mesh with one of said three sleeve gears, one of the carrier gears being in mesh directly with one of the other sleeve gears and a reversing gear drive between the third sleeve gear and the other carrier gear, control means for securing the main shaft and its sun gear from rotating and metering means for selectively rotating either the planetary gear or to be actuated by the rotation of the planetary gear.

4. In a device of the class described, the combination of two deviation prisms, means for mounting the same for rotation about a common axis, mechanism for driving the prisms in relatively opposite directions including a single sleeve provided with three gears, a direct driving connection between one of the gears and one of the prisms, a driving connection including a reversible gear drive between another of said gears and the other prism, power means engaging the third gear for rotating the sleeve and its gears, two sources of power for actuating said power means, one of said sources being manually actuated and the other actuated by the rotation in space of the means for mounting the prisms.

5. In a device of the class described, the combination of a stand, a tube mounted for rotary movement in the stand and provided with an opening adjacent the stand, an annular rack encircling the tube adjacent the opening, means for securing the rack selectively either to the stand or to the tube, a unit adapted to be intruded into the opening and including a closure base for covering the opening, a shaft journalled in the unit within the casing, a revolvable gear drive journalled in the base and including an external pinion meshing with the rack, an internal pinion meshing with the shaft, a pair of sleeves loose on the shaft, a sun gear secured to the shaft between the sleeves, a planetary gear drive between each sleeve and the sun gear, means forming two deflection prism systems, one for each sleeve and each operatively connected with its associated sleeve, and reversing driving means between the two planetary gear drives for causing them to rotate in relatively reversed directions and means including a scale for indicating a function of the angle of rotation of the planetary gear drive and thus of the two deflection prism systems in terms of indications on the scale.

6. In a device of the class described, the combination of a stand, a tube mounted for rotary movement in the stand and provided with an opening adjacent the stand, an annular rack encircling the tube adjacent the opening, means for securing the rack selectively either to the stand or to the tube, a unit adapted to be intruded into the opening and including a closure base for covering the opening, a shaft journalled in the unit within the casing, a revolvable gear drive journalled in the base and including an external pinion meshing with the rack, an internal pinion meshing with the shaft, a pair of sleeves loose on the shaft, a sun gear secured to the shaft between the sleeves, a planetary gear drive between each sleeve and the sun gear, and means forming two deflection prism systems, one for each sleeve and each operatively connected with its associated sleeve.

7. In a device of the class described, the combination of a stand, a tube journalled for rotary movement in the stand, an annular rack encircling the tube adjacent the stand, detachable means for securing the rack to the stand, a deflection prism system mounted in the tube for rotation about an optic axis, mechanism for rotating the prism system including an intergeared drive, manually controlled means for actuating said drive, means actuated by the rotation of the tube relative to the stand for actuating said drive, said last named means including a revolvable gear drive meshing with the rack, and indicating means coacting with said drive and including a scale for designating a function of the angle of turn of the prism system in terms of the markings on the scale.

8. In a device of the class described, the combination of a stand, a casing journalled for rotary movement in the stand, an annular rack encircling the casing at the stand, means securing the rack selectively either to the stand or casing, a revolvable gear drive journalled in the casing and engaging the rack and rotated or held stationary thereby, a deflection prism system in the casing and including prisms mounted for rotary movement, a planetary gear drive journalled in the casing, including a sun gear operatively connected to the revolvable gear drive to be driven or held by the revolvable gear drive in its engagement with the rack whereby the prism systems may be rotated incidental to the rotation of the casing in its stand, and manually actuated means for driving the planetary gear drive independently of the movement imposed thereon by the rotating casing.

9. In a device of the class described having two optic deflection systems each comprised of two elements mounted for rotary movement about an optic axis, mechanism for rotating the two elements of each system in relatively reversed directions, said mechanism including two planetary differential drives one for each system and having a common sun gear, a driving connection between each differential drive and the two elements of its associated system and acting to drive the same in reversed directions, means coacting with the sun gear for rotating the differential drives in unison and indicating means for indicating a function of the angle through which the elements of the optic system have been rotated from a zero position.

10. In a device of the class described, the combination of a stand, a tube journalled for rotary movement in the stand, an annular rack encircling the tube, detachable means for securing the rack at will to the tube, a deflection prism system mounted on the tube for rotation about an optic axis, mechanism for rotating the prism system comprising an intergeared drive including a sun gear, means locked by the rack when secured to the tube for holding the sun gear from rotating, and a manually actuated control engaging the intergeared drive to rotate the same about the sun gear as a fixed center and thus manually rotate the deflection prism system.

11. In a device of the class described, the combination of a stand, a tube journalled for rotary movement in the stand, an annular rack encircling the tube, means for selectively securing the rack either to the stand or to the tube, a deflection prism system mounted in the tube, mechanism for rotating said prism system manually controlled means for actuating said mechanism, means controlled by the rack for actuating the mechanism, and a control for said mechanism operatively dependent upon whether the rack is secured to the stand or to the tube to determine whether the mechanism is actuated respectively by the rotation of the tube or by the manually controlled means.

12. In a device of the class described, the combination of a main shaft, a sun gear secured thereto, two differential planetary gear trains loosely journalled on the shaft and each geared to the sun gear, two pairs of prism carriers mounted for rotary movement about a common axis, one pair for each planetary gear train, means between each gear train and its associated pair of carriers for rotating the carriers in relatively reversed directions, said two gear trains coacting to rotate one carrier in each pair in the same direction as a carrier of the other pair, means for rotating the sun gear, means for rotating both of the planetary gear trains, and means for indicating the rotary movement of the planetary gear trains.

13. In a device of the class described, the combination of a main shaft, a sun gear secured thereto, a planetary gear loose on the shaft, a gear sleeve loose on the shaft, a planetary pinion set journalled in the planetary gear and meshing with both the sun gear and the sleeve, a pair of prism carriers mounted for rotary movement about a common axis, means driven from the sleeve for rotating the carriers in relatively reversed direction, means for selectively fixing the sun gear and rotating the planetary gear or for rotating the sun gear, and metering means geared to the planetary gear.

14. In a device of the class described, the combination of two prism systems mounted for rotary movement about a common axis, mechanism for rotating the prism systems including a shaft extending parallel to said axis, bearings for said shaft adjacent opposite ends thereof, a sun gear secured to the shaft adjacent its center, two sets of prism rotating elements, one set for each prism journalled on the shaft and fitted between the sun gear and the adjacent bearing, said elements including a planetary drive geared to the sun gear, a sleeve driven from the planetary drive, means for rotating the shaft and thus rotating said elements in unison, means for rotating the planetary drives in unison, and driving means between each sleeve and its associated prism system.

ALEXINA CAMPBELL,
*Executrix of Ben J. Campbell, Deceased.*